(12) United States Patent
Chopra et al.

(10) Patent No.: US 9,789,650 B2
(45) Date of Patent: Oct. 17, 2017

(54) CONVERSION OF STEREOLITHOGRAPHIC MODEL INTO LOGICAL SUBCOMPONENTS

(71) Applicant: Adobe Systems Incorporated, San Jose, CA (US)

(72) Inventors: Harsh Vardhan Chopra, New Delhi (IN); Amit Mittal, Uttar Pradesh (IN); Naveen Prakash Goel, Uttar Pradesh (IN)

(73) Assignee: Adobe Systems Inc., San Jose, CA (US)

( * ) Notice: Subject to any disclaimer, the term of this patent is extended or adjusted under 35 U.S.C. 154(b) by 507 days.

(21) Appl. No.: 14/514,675

(22) Filed: Oct. 15, 2014

(65) Prior Publication Data

US 2016/0107388 A1    Apr. 21, 2016

(51) Int. Cl.
| | | |
|---|---|---|
| *G06F 19/00* | (2011.01) | |
| *B29C 67/00* | (2017.01) | |
| *G05B 15/02* | (2006.01) | |
| *G05B 19/4099* | (2006.01) | |
| *G06T 17/00* | (2006.01) | |

(Continued)

(52) U.S. Cl.
CPC .......... *B29C 67/0088* (2013.01); *G05B 15/02* (2013.01); *G05B 19/4099* (2013.01); *G06T 17/00* (2013.01); *G06T 17/10* (2013.01); *B33Y 50/02* (2014.12); *G05B 2219/35117* (2013.01); *G05B 2219/49008* (2013.01)

(58) Field of Classification Search
CPC .................................................. B29C 67/0088
USPC ..................... 700/95–111, 275–306
See application file for complete search history.

(56) References Cited

U.S. PATENT DOCUMENTS

| | | | | | |
|---|---|---|---|---|---|
| 4,575,330 A | * | 3/1986 | Hull | ..................... | B29C 67/0062 156/58 |
| 5,365,996 A | * | 11/1994 | Crook | ................ | A61B 17/7059 164/35 |

(Continued)

OTHER PUBLICATIONS

Morris, C. L., R. F. Barber, and R. Day. "Orofacial prosthesis design and fabrication using stereolithography." Australian dental journal 45.4 (2000): pp. 250-253.*

(Continued)

*Primary Examiner* — Satish Rampuria
(74) *Attorney, Agent, or Firm* — Finch & Maloney PLLC (57) ABSTRACT

Techniques are disclosed for converting a stereolithographic model into an STL data file that defines logically related components and subcomponents of an object. A user can categorize elements of an object to form logically related components and subcomponents of the object. Each element is represented by a triangle. All triangles representing each of these components and subcomponents are then reordered and listed sequentially within the STL. Each list is delimited at the beginning and end by two hidden triangles, one or both of which store unique identification values that are associated with the respective individual components. Additionally, a reference table can be added to the STL. The reference table includes instructions, operations or other information that is specifically associated with each component and subcomponent using the unique identification values. These instructions and operations enable users to have better control over 3D print quality than is possible using existing techniques.

20 Claims, 7 Drawing Sheets

(51) Int. Cl.
*G06T 17/10* (2006.01)
*B33Y 50/02* (2015.01)

(56) References Cited

U.S. PATENT DOCUMENTS

| | | | | |
|---|---|---|---|---|
| 5,452,407 | A | * | 9/1995 | Crook ................ A61B 17/7059 345/420 |
| 5,454,069 | A | * | 9/1995 | Knapp .................... G06T 17/00 345/420 |
| 5,596,504 | A | * | 1/1997 | Tata ........................ G06T 17/00 345/420 |
| 5,823,778 | A | * | 10/1998 | Schmitt .................... A61C 9/00 433/214 |
| 2002/0086247 | A1 | * | 7/2002 | Coe .................... B29C 67/0066 430/328 |
| 2003/0167099 | A1 | * | 9/2003 | Kesavadas .......... B29C 67/0088 700/119 |
| 2006/0155418 | A1 | * | 7/2006 | Bradbury ........... G05B 19/4099 700/182 |
| 2015/0273631 | A1 | * | 10/2015 | Kenney ................ B22F 3/1055 419/53 |

OTHER PUBLICATIONS

D'Urso, Paul S., et al. "Stereolithographic biomodelling in cranio-maxillofacial surgery: a prospective trial." Journal of cranio-maxillofacial surgery 27.1 (1999): pp. 30-37.*

Klug, Clemens, et al. "Point-to-point computer-assisted navigation for precise transfer of planned zygoma osteotomies from the stereolithographic model into reality." Journal of oral and maxillofacial surgery 64.3 (2006): pp. 550-559.*

Bouyssie, J. F., et al. "Stereolithographic models derived from X-ray computed tomography reproduction accuracy." Surgical and Radiologic Anatomy 19.3 (1997): pp. 193-199.*

Sodian, Ralf, et al. "Application of stereolithography for scaffold fabrication for tissue engineered heart valves." Asaio Journal 48.1 (2002): pp. 12-16.*

* cited by examiner

CONVERSION OF STEREOLITHOGRAPHIC MODEL INTO LOGICAL SUBCOMPONENTS

FIELD OF THE DISCLOSURE

This disclosure relates to the field of data processing, and more particularly, to techniques for converting a stereolithographic model into a collection of logical components and subcomponents.

BACKGROUND

Stereolithography is a process for fabricating three-dimensional objects by successively depositing layers of material (e.g., plastic), one on top of the other. STL, which is also referred to as Standard Tessellation Language, is a file format for encoding representations of three-dimensional (3D) structures. STL is often used for stereolithography applications such as computer-aided design and 3D printing. An STL file describes a raw, unstructured triangulated surface by the unit normal vector and vertices of each triangle using a 3D Cartesian coordinate system. The STL format is recognized by many commercial and Open Source 3D applications.

SUMMARY

In accordance with an embodiment, a computer-implemented data processing method includes receiving facet data representing a stereolithographic model. The facet data includes a plurality of visible facets each representing a visible surface of the stereolithographic model. The method further includes associating at least one of the visible facets with a component of the stereolithographic model, reordering a portion of the facet data, assigning a unique identification value to the component, and delimiting the reordered portion of the facet data with at least one of a beginning facet and an ending facet containing the unique identification value. The beginning facet and the ending facet each represent an invisible surface of the stereolithographic model, wherein the visible surface includes facets that are to be rendered or printed, and wherein the invisible surface excludes facets that are to be rendered or printed. The method further includes generating reference table data representing a mapping between the unique identification value and custom data associated with the component, wherein the custom data includes a method, operation or transformation that is applied to a component of the stereolithographic model.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

An STL file includes data that represent a model of a three-dimensional object. The surface of an STL-modeled object is formed by a list of facets, or triangles. As used in this disclosure, a "facet" or "triangle" is a set of data defining three points in Cartesian space (the vertices), a unit normal vector, and, in some cases, additional information, such as color. Existing applications parse the list of triangles and render all of them in the order they appear in the STL. One limitation of the existing STL file structure is that the triangles in the file are logically unrelated; that is, each surface defined by a triangle exists independently of all other surfaces. These triangles have no logical associations and do not contain any structural information that can be used, for example, to apply operations to specific components or subcomponents of the object, such as rigging, re-meshing (e.g., reducing the number of triangles by combining triangles together), incremental rendering of the model, or unwrapping complex 3D models (e.g., a model of a human figure). While the existing STL file structure is sufficient for rendering or printing the entire object, it not possible for existing STL viewing or rendering applications to perform operations on logical components (e.g., rendering only the surfaces of a subcomponent of the object) without manually placing those components into separate STL files and processing each file independently of the other.

To this end, and in accordance with an embodiment of the present invention, techniques are disclosed for converting a stereolithographic model into an STL data file that defines logically related components and subcomponents of an object. Each element of the model is represented by a triangle. A user can categorize these elements to form logically related components and subcomponents of the modeled object. All triangles representing each of these components and subcomponents are then reordered and listed sequentially within the STL. Each list is delimited at the beginning and ending by two additional triangles having null vertices, which are referred to as hidden triangles because they do not render or print into a visible element. One or both of the delimiting triangles store unique identification values that are associated with the respective individual components. Additionally, a reference table is added to the STL. The reference table includes custom data, such as instructions, operations or other custom information, that is specifically associated with each component and subcomponent. The reference table includes a mapping between the unique identification values and the custom data associated with the respective components and subcomponents. These instructions, operations and custom information enable users to have better control over 3D print quality than is possible using existing techniques, in part because the information is specific to each component. Examples of such 3D print quality control include: user-specified, component-based wall thickness, head cooling and layer thickness; automated part-based hollowing; and automated part-based decimation or subdivision. STL files containing structural information, in accordance with various embodiments of the present invention, are compatible with existing STL applications and specifications, which ensures the validity of the STL file and does not change the appearance of the STL model, or any subcomponent, when the model is rendered or printed using existing techniques. According to various embodiments, the grouping and embedding of group-specific logic/instructions is achieved via hidden triangles, which will be safely ignored by existing STL parsers/viewers. The information in the hidden triangles is used by a custom module residing on host or inside a 3D printer. Therefore, existing applications can continue to work with an enhanced STL, in accordance with various embodiments, in the same manner as they currently do. Numerous configurations and variations will be apparent in light of this disclosure.

Example System

Figure 1:
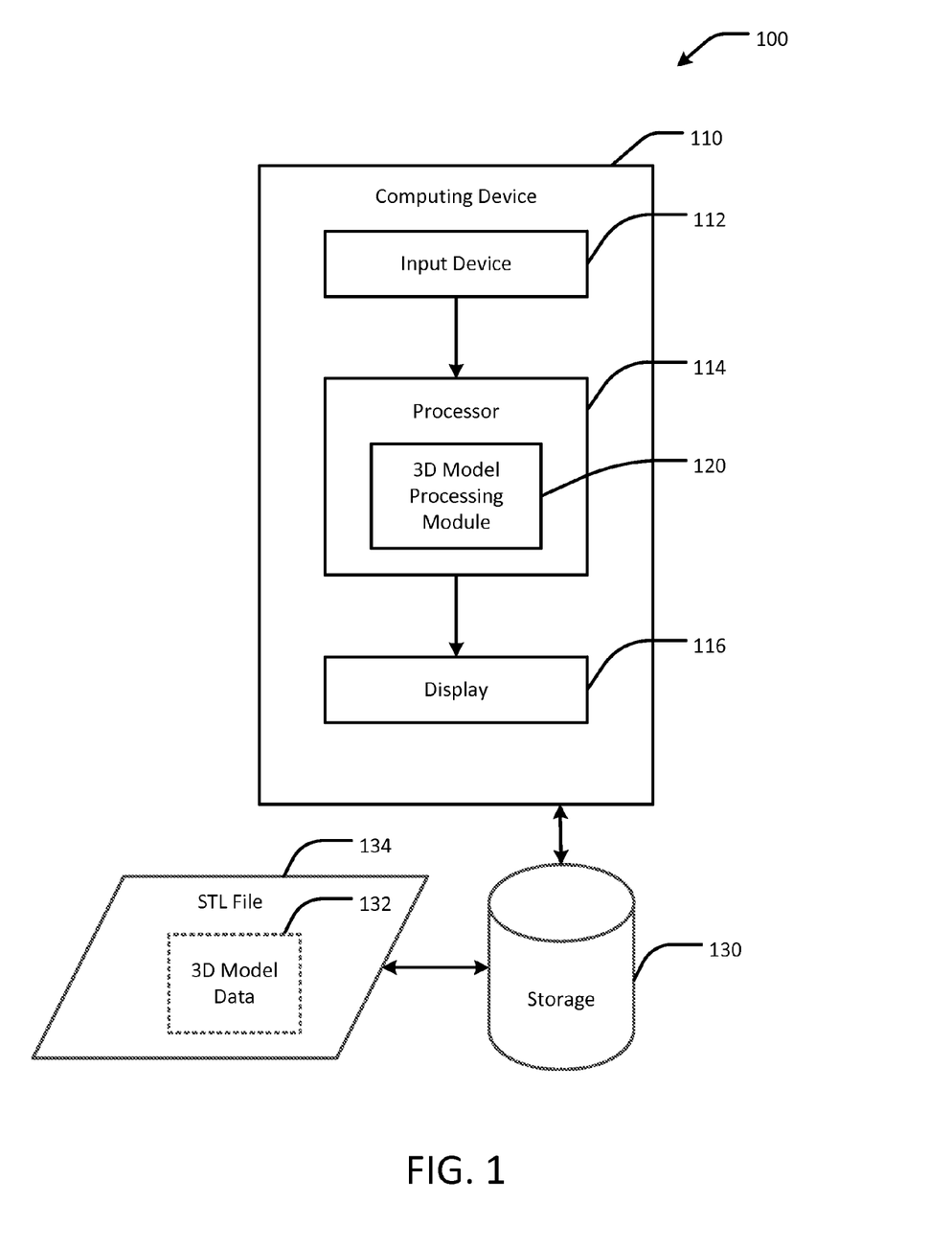
FIG. 1 illustrates an example system for converting a stereolithographic model into a collection of logical components and subcomponents, in accordance with an embodiment of the present invention.

FIG. 1 shows an example system 100 for converting a stereolithographic model into a collection of logical components and subcomponents, in accordance with an embodiment of the present invention. The system 100 can be integrated into a computing device 110, which may be, for example, a desktop or laptop personal computer (PC), a workstation, a tablet, a smartphone, a game console, a set-top box, or other such computing devices. The computing device 110 includes an input device 112, a processor 114, and a display 116. The processor 114 is configured to execute a 3D model processing module 120. The 3D model processing module 120 may, for example, be provided as part of a graphical editing application, a standalone application, an application plug-in, or a service. The system 100 further includes a storage 130, such as a database, which is configured to store 3D model data 132 in an STL file 134. The storage 130 can be integrated into the computing device 110 (e.g., in random access memory) or operatively connected to the computing device 110 via a communication channel, such as a data bus or a network interface.

Example Use Case

Figure 2:
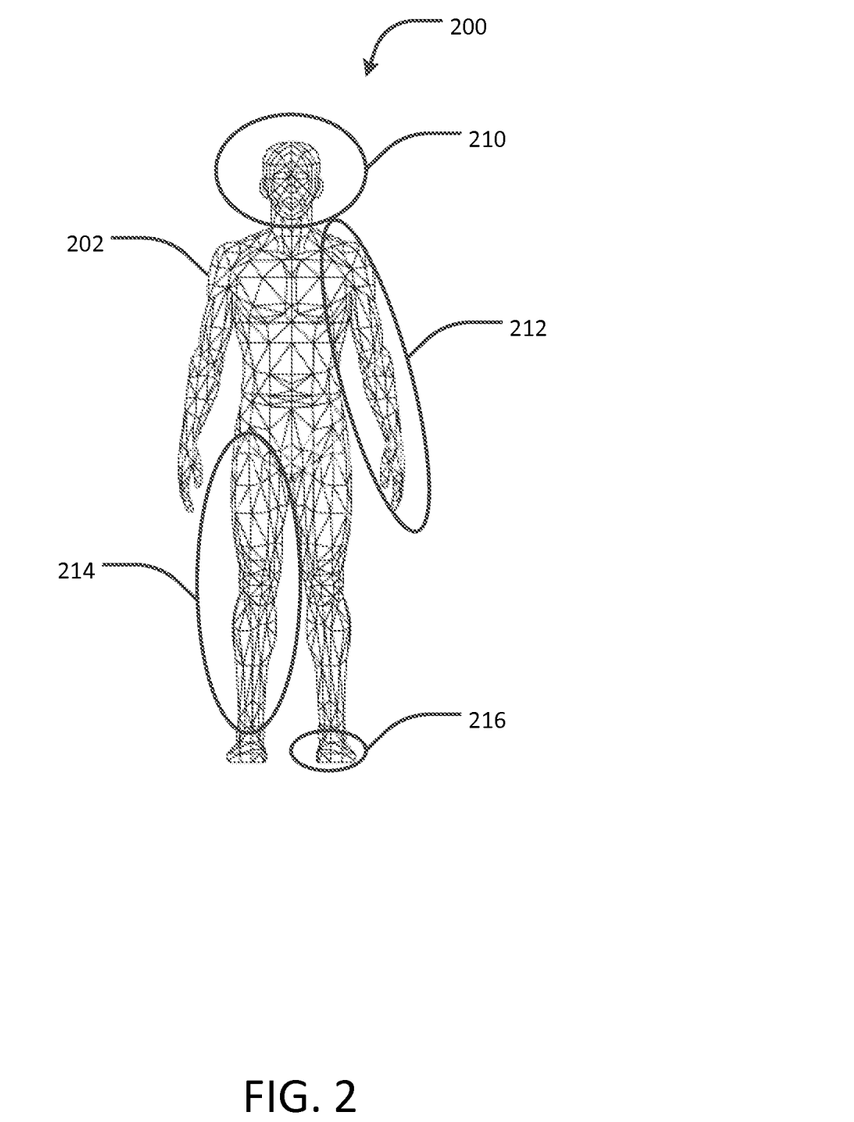
FIG. 2 shows a two-dimensional rendition of an example 3D object, in accordance with an embodiment of the present invention.

FIG. 2 shows a two-dimensional rendition of an example 3D object 200, modeled in accordance with an embodiment. The object 200 is modeled by a set of triangles (e.g., 3D model data 132 of FIG. 1), one of which is indicated at 202. In this example, the object is a human form, although it will be understood that the triangles can form an object of any shape and appearance. As can be seen, some of the triangles 202 form components of the object 200, such as the head 210, arm 212, leg 214 and foot 216 of the object 200. Other triangles 202 can form any number of different components of the object 200, as desired by a user, and the user can designate which triangles belong to which components. These triangles can be represented in an STL file as sets of facet data that define the vertices of each triangle. In accordance with an embodiment, the author of the model can mark parts of the model as logical components. For instance, the author can mark the triangles forming the head 210, arm 212, leg 214 and foot 216, respectively, as logical components. Each triangle is logically associated with one or more other triangles by reordering the triangles in the STL file such that logically related triangles are sequentially listed and delimited at the beginning and end of the listing by a pair of hidden triangles, or markers. The reordering occurs because the triangles are not necessarily in any particular order prior to the user marking the triangles. For instance, some or all of the triangles that form the head 210 can be grouped together in the STL file. Similarly, some or all of the triangles that form the arm 212, leg 214 and foot 216 can be grouped in this manner.

Figure 3:
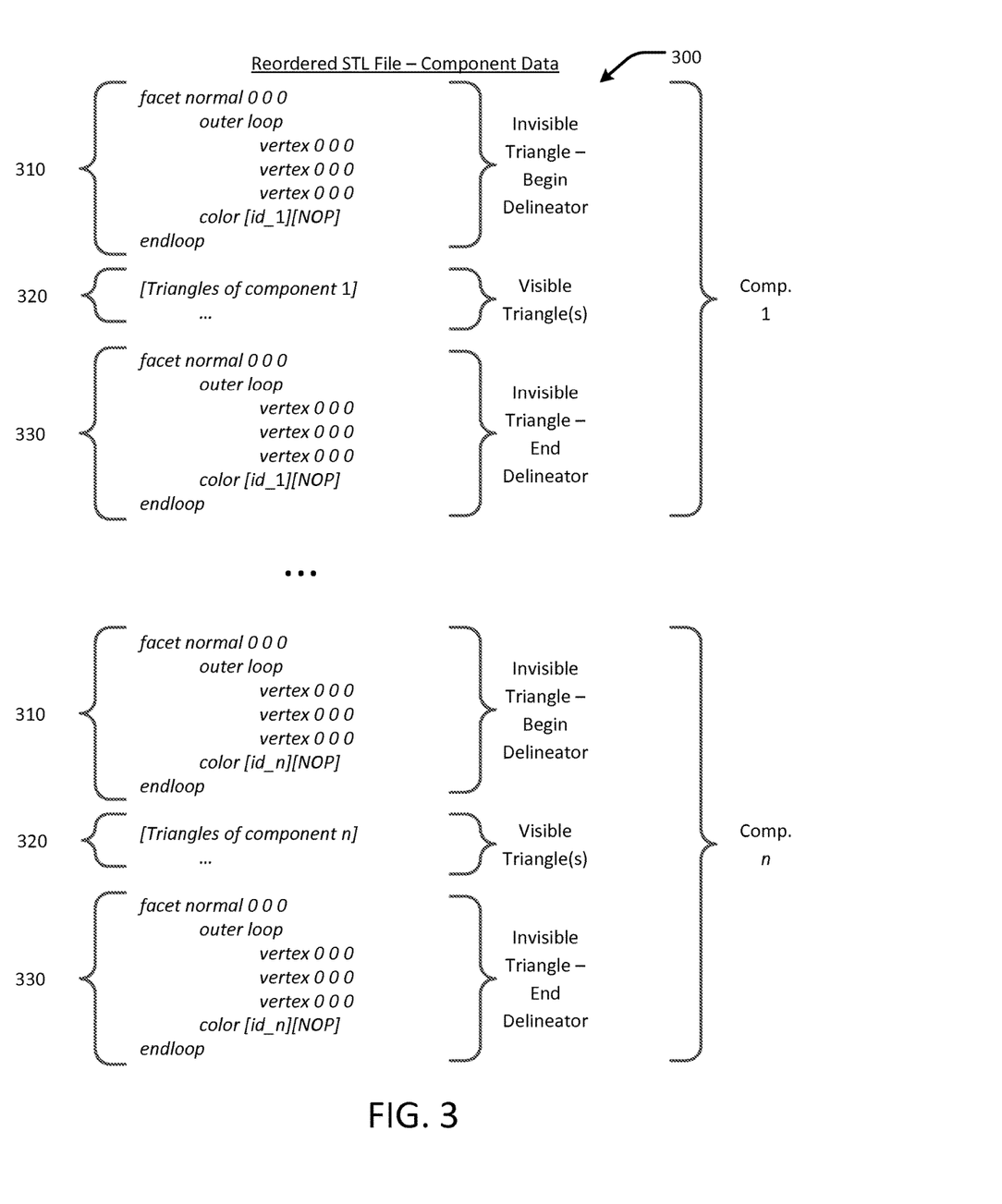
FIG. 3 shows a portion of an example reordered STL file, in accordance with an embodiment of the present invention.

FIG. 3 shows a portion 300 of an example reordered STL file (e.g., STL file 134 of FIG. 1), in accordance with an embodiment of the present invention. This portion 300 of the STL file includes, in ASCII format, a list of facets 310, 320, 330 for a single component or subcomponent of an object, which is a logical grouping of triangles in the STL file. It will be understood that the list of facets 310, 320, 330, and any other data in the STL file, can be stored in formats other than ASCII, such as binary. The STL file can contain any number of such components or subcomponents 1 . . . n, each having a unique identifier id_1 . . . id_n. Referring to the example object 200 of FIG. 2, the components may correspond to the head 210, arm 212, leg 214 and foot 216, respectively, of the object 200. Facet 310 is an invisible triangle that delineates the beginning of each logical grouping of triangles, and facet 330 is another invisible triangle that delineates the ending of each logical grouping. In between the beginning facet 310 and the ending facet 330 are one or more facets 320 that represent the visible triangles, which are surfaces of the object, associated with a given component or subcomponent of the object. Each facet 310, 320, 330 includes a unit normal vector, which is a line perpendicular to the triangle having a length of one unit, and three vertices that define the corners of the triangle. In some embodiments, the normal and each vertex are specified by three coordinates each, for a total of twelve (12) values for each facet 310, 320, 330. These values can be stored in a binary format using integer and floating point numerical representations. In a binary STL file format, a two byte count color field ("id" field) is stored along with each triangle. This color field can be used to store metadata related to the corresponding component or subcomponent of the object (e.g., a unique identification number). As can be seen in FIG. 3, the delineating facets 310 and 330 represent invisible triangles because the normal and vertices have zero or null values. As such, these facets 310, 330 will not render or print when processed by an STL-compatible application.

Figure 4:
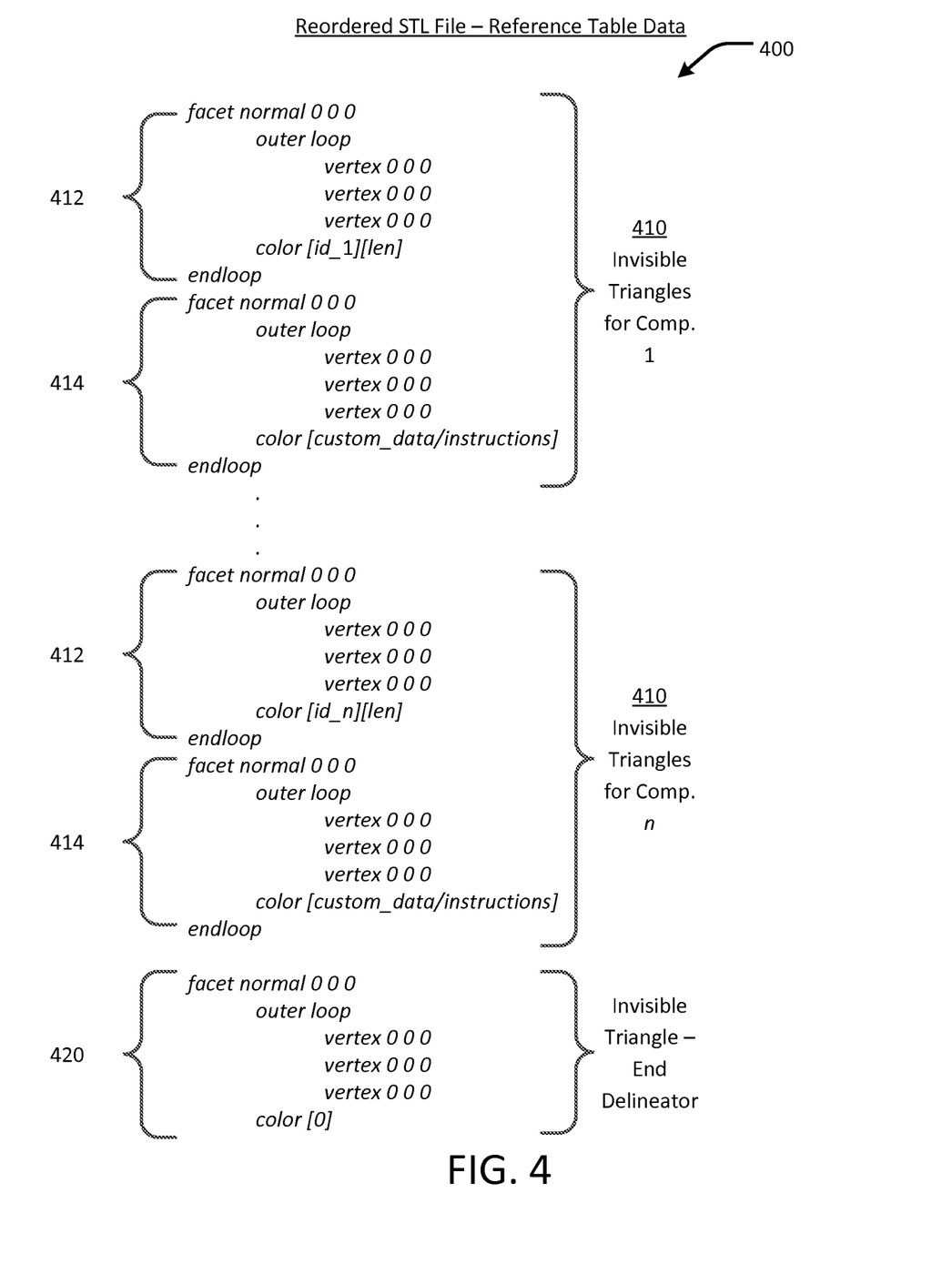
FIG. 4 shows another portion of the example reordered STL file of FIG. 3, in accordance with an embodiment of the present invention.

FIG. 4 shows another portion 400 of the example reordered STL file of FIG. 3, in accordance with an embodiment of the present invention. This portion 400 of the STL file includes additional facets 410 representing portions of a reference table. The reference table provides a mapping between the unique identifiers id_1 . . . id_n of the components and custom data (e.g., instructions or operations) associated with those components. The reference table can be stored at the beginning of the STL file as a continuous sequence of facets 410, which are invisible triangles. Each sequence of facets 410 correspond to one of the components in the model. The sequence of facets 410 begins with an invisible triangle 412 having the unique identifier of the corresponding component and a length ("len") value. The length value len represents the number of invisible triangles 414 in the sequence of facets 410 that are used to store custom information for the corresponding component in the color value field of the invisible triangles 414. The end of the reference table is delimited with another facet 420, which is also an invisible triangle. The ending facet 420 includes zero in the color value field to identify the facet as an ending delimiter for the reference table. Facets that follow the ending facet 420 of the reference table may, for example, include the facets 310, 320 and 330 such as described with respect to FIG. 3. With this structure, if there are n components of the object, each having m bytes of information, then there will be n*(m/2+1)+1 invisible triangles for the reference table and 2*n invisible triangles associated with each component. As such, there are a total of n*(m/2+1)+1+2n invisible triangles in the STL file in addition to the visible triangles. The triangle count stored in the header of the STL file is therefore incremented by this total amount to reflect the total number of visible and invisible triangles in the STL file.

Custom data stored in the reference table for any logical component includes any structural information that can be used, for example, by an STL previewer or 3D printer to process and print the STL file intelligently. The custom data (e.g., operations or instructions) stored in the invisible triangles 414 can enable many new workflows that are either impossible or very difficult to achieve using existing techniques. Such workflows, for example, enable different operations, processing, and handling for individual components or subcomponents of an object, such as assigning different importance or weight to different components and subcomponents, and using such importance or weight to apply priority-aware, component and subcomponent specific re-meshing techniques for optimum 3D printing; applying different search/extract/delete operations or un-wrapping/material support for each individual component or subcomponent; applying compression techniques that exploit common characteristics among different components, subcomponents or regions of the object; displaying a component or subcomponent as soon as it is rendered rather than waiting until the entire object is rendered to display each component or subcomponent; and indexing the STL based on the components or subcomponents, which enables search and extract, delete, and other operations to be performed on a component or subcomponent level. For example, if the custom data for a hand component includes "delicate," then a custom handler in the 3D printer can be created to process and print the hand with a greater wall thickness. Similarly, other structural information can be stored in the STL file to achieve better print quality. Another example is part-specific 3D depth resolution (or 3D mesh density). The 3D depth resolution can be varied by applying different magnitudes of decimation or subdividing. Decimation includes a process to a process to decrease mesh density, decrease 3D depth resolution, or combine existing constituent triangles to decrease overall number of constituent triangles. Subdividing includes a process to increase mesh density, increase 3D depth resolution, or further divide existing constituent triangles to add number of constituent triangles. Greater depth resolution can provide better detail when rendering or printing the 3D object. However, it is not always desirable to apply the same depth resolution to all components of the object. To this end, in accordance with an embodiment, custom data for each logical component of the 3D object can include different depth resolution values based on their priority/importance/context in relation to other logical components. In this manner, each logical component can have a different depth resolution.

According to various embodiments, a reordered STL file, such as described with respect to FIGS. 3 and 4, enables several beneficial workflows. One example workflow is a fast 3D preview workflow. Existing STL-consuming applications read the entire STL file and convert the file into a memory representation, which may be proprietary. Because of this, previewing large STL files can consume a lot of time. By contrast, a reordered STL file in accordance with various embodiments enables these applications to handle individual components and subcomponents, which will lead to a more responsive user interface. Furthermore, many vendors of 3D rendering applications provide online viewer for their users to view and work with 3D models. Currently almost all of these 3D models are first sent to a browser from a server and then rendered in whole by the browser. By contrast, a reordered STL file in accordance with various embodiments enables the server to instead send individual components and subcomponents to the browser separately, which will enable a faster, incremental preview of the models inside browser.

In accordance with an embodiment, another example workflow is provided for unwrapping and texture support. Using existing techniques, it is very difficult to unwrap a complex 3D model (e.g., flatten a three-dimensional surface into a two-dimensional surface) and apply texture on it. By contrast, a reordered STL file in accordance with various embodiments enables individual components and subcomponents to be unwrapped separately, making it easier to apply texture on them. Furthermore, higher resolution texture data can be generated for components and subcomponents having a higher priority (importance).

In accordance with an embodiment, another example workflow is provided for priority-aware re-meshing operations for 3D printing. Using a reordered STL file in accordance with various embodiments enables improved or optimized 3D printing by allowing different re-meshing techniques to be applied on different components and subcomponents. For example, a user can prevent a lower level of decimations on specific components (e.g., the face 210 of FIG. 2), and similarly the user can indicate a higher level of decimations on other components (e.g., the leg 214 of FIG. 2).

In accordance with an embodiment, another example workflow is provided for search, extract, delete, move or rotate operations for individual components of a 3D object. Using a reordered STL file in accordance with various embodiments enables searching of components and subcomponents based on the structural information stored in the STL, which is not possible using existing techniques. Additionally, a user can extract or delete individual components and subcomponents more easily.

In accordance with an embodiment, another example workflow is provided for part-specific handling during 3D printing. Such part-specific handling includes component-based wall thickness, in which a user can assign varying levels of strength to individual components in the STL file (e.g., delicate, normal and sturdy). For example, a delicate level may be assigned to shoes or fingers, which can then be printed with more wall thickness as compared to other parts. This can be done by sending instruction commands to a 3D printer engine to adjust binder and material extrusion. Other part-specific handling includes component-based head cooling. In 3D printing, printer head cooling also governs the strength of the 3D printed model. As such, in accordance with an embodiment, different cooling times can be specified for different components of the model based on the strength assigned to those components. Yet other part-specific handling includes component-based layer thickness. Layer thickness governs the resolution (density of 3D mesh) of the final 3D printout. According to an embodiment, a user can mark the component level layer resolution for better and more optimized printouts. For example, a human face can be marked as a high resolution component, which will then be printed with lower layer thickness to increase the details in the face region of the final 3D printed figurine.

In accordance with an embodiment, another example workflow is provided for smart STL viewing. Existing STL viewers need to parse entire STL file and render it completely, which can take considerable time to render a large 3D model. By contrast, a reordered STL file in accordance with various embodiments enables the STL viewer to parse and render individual components and subcomponents separately, which will result in a better and more responsive application. This also allows an STL editor to operate (cut, move, duplicate, etc.) on logical components more easily.

In accordance with an embodiment, another example workflow is provided for automated part-based hollowing. In existing applications, a user can only specify a single level of hollowing for the entire 3D model. To do part-based hollowing, the user has to separate the individual parts into separate 3D data files and apply different hollowing parameters on individual parts. This existing process can be very difficult and tedious to accomplish. By contrast, a reordered STL file in accordance with various embodiments enables a user to mark individual components for automated processing of part-based hollowing (e.g., apply hollow level 1 on all faces, hollow level_2 on all hands, hollow level_3 on all legs, etc.).

In accordance with an embodiment, another example workflow is provided for automated part-based decimation and subdivision. Decimate and subdivide operations are used in 3D modeling to decrease or increase the density, and hence the quality, of the 3D model meshes. With existing applications, a user can select a certain region and decimate or subdivide the selected region. Subdivide will increase the vertex count (and, hence, will increase the quality) and decimation will decrease the vertex count (and, hence, will make the model lighter but slightly inferior in quality). Using existing techniques, decimate and subdivide operations are very difficult and tedious to perform and cannot be automated. By contrast, a reordered STL file in accordance with various embodiments enables a user to assign a priority to each component in the STL file, and then each component can be (e.g., automatically) decimated or subdivided based on the assigned priority. For example, low level of decimation/higher level of subdivision can be applied on a face if the face component is assigned a high priority. As such, an automated process can be run on a large set of 3D models for performing part- (priority-) based decimation and subdivide operations (e.g., apply decimation level_1 on all faces, decimation level_2 on all hands, decimation level_3 on all legs, etc.)

Example Methodologies

Figure 5A:
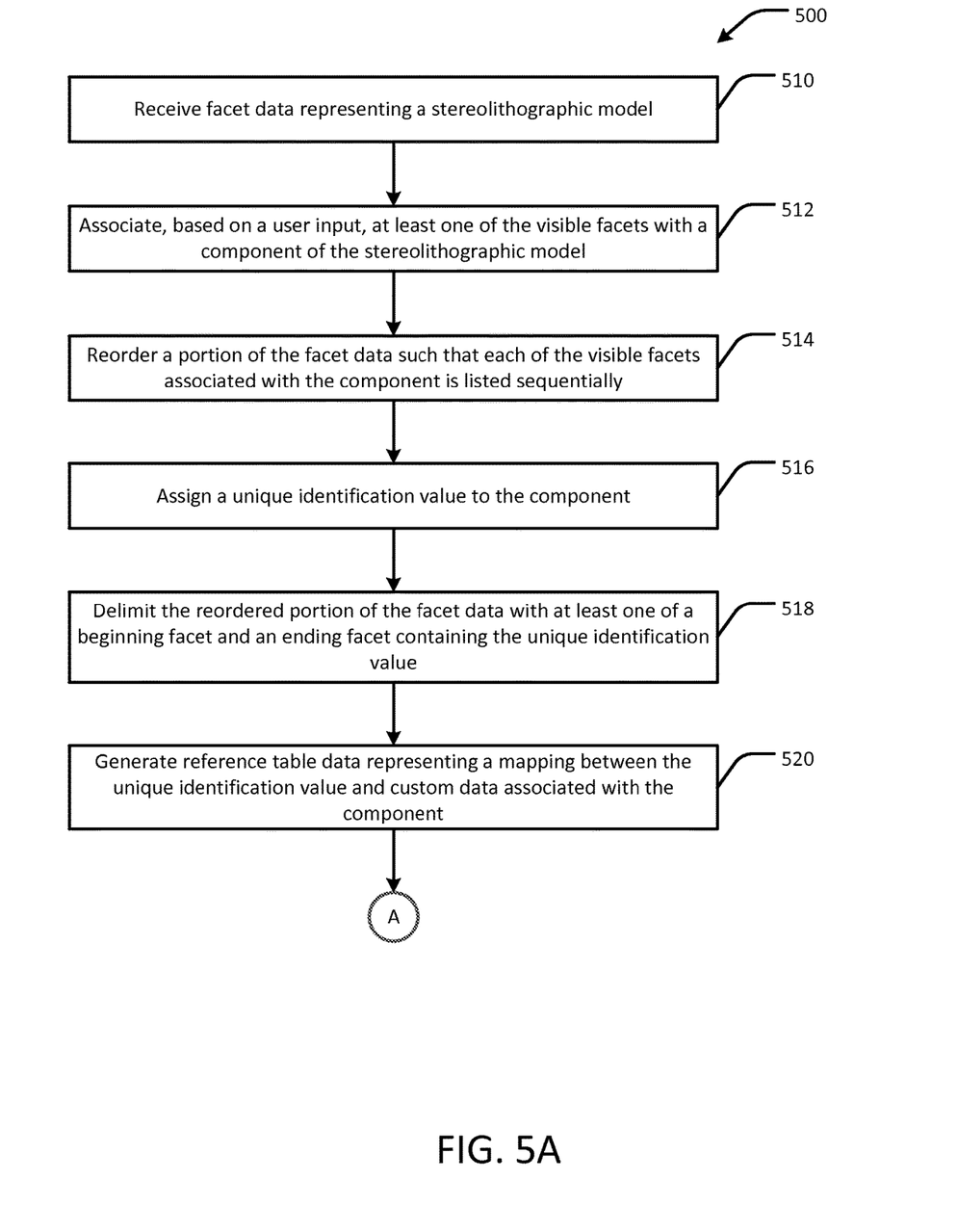
FIGS. 5A and 5B show a flow diagram of an example methodology for converting a stereolithographic model into a collection of logical components and subcomponents, in accordance with an embodiment of the present invention.
Figure 5B:
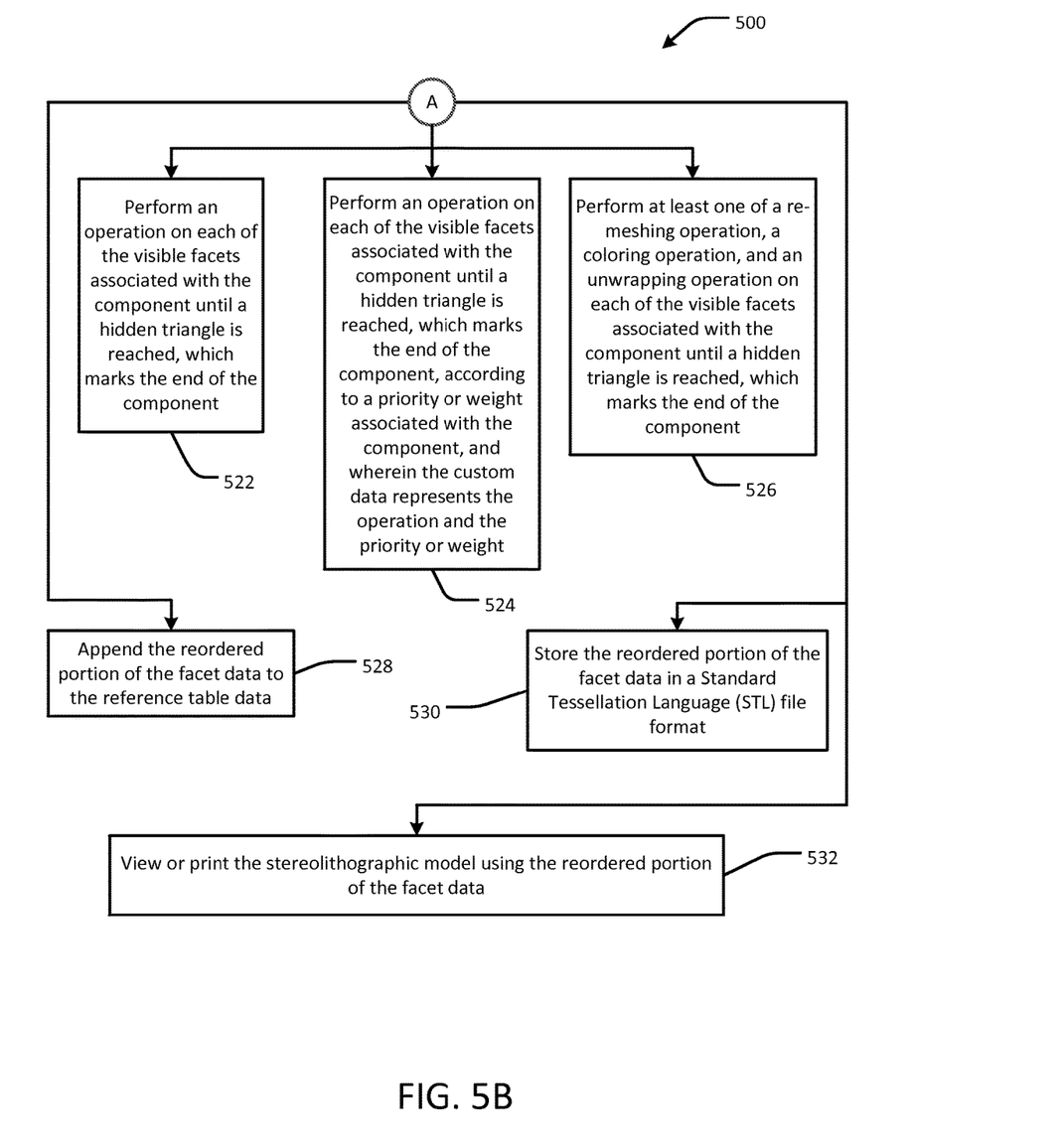

FIGS. 5A and 5B show a flow diagram of an example methodology 500 for converting a stereolithographic model into a collection of logical components and subcomponents, in accordance with an embodiment. The example methodology 500 may, for example, be implemented by the 3D model processing module 120 of FIG. 1. Referring first to FIG. 5A, the method 500 begins by receiving 510 facet data representing a stereolithographic model. The facet data includes a plurality of visible facets each representing a visible surface of the stereolithographic model. The method 500 continues by associating 512, based on a user input, at least one of the visible facets with a component of the stereolithographic model. The user input may be obtained, for example, via a STL viewing or authoring application in which the user can select and designate visible facets as part of a component or subcomponent. Each of the visible facets may, for example, include data representing a unit normal vector and three vertices in Cartesian space. The method 500 continues by reordering 514 a portion of the facet data such that each of the visible facets associated with the component is listed sequentially, assigning 516 a unique identification value to the component, and delimiting 518 the reordered portion of the facet data with a beginning facet, an ending facet, or both, either of which can contain the unique identification value. The beginning facet and the ending facet each represent an invisible surface of the stereolithographic model, such that these facets are not rendered or printed. The method 500 continues by generating 520 reference table data representing a mapping between the unique identification value and custom data associated with the component.

Referring next to FIG. 5B, in some cases, the method 500 continues by performing 522 an operation on each of the visible facets associated with the component until a hidden triangle is reached, which marks the end of the component, where the custom data represents the operation. In some cases, the method 500 continues by performing 524 an operation on each of the visible facets associated with the component until a hidden triangle is reached, which marks the end of the component, according to a priority or weight associated with the component, where the custom data represents the operation and the priority or weight. In some cases, the method 500 continues by performing 526 a re-meshing operation, a search/extract/delete operation, an unwrapping operation, or any combination of these or other suitable operations on each of the visible facets associated with the component, until a hidden triangle is reached, which marks the end of the component. In some cases, the method 500 continues by appending 528 the reordered portion of the facet data to the reference table data. In some cases, the method 500 continues by storing 530 the reordered portion of the facet data in a Standard Tessellation Language (STL) file format. In some cases, the method 500 continues by viewing or printing 532 the stereolithographic model using the reordered portion of the facet data.

Example Computing Device

Figure 6:
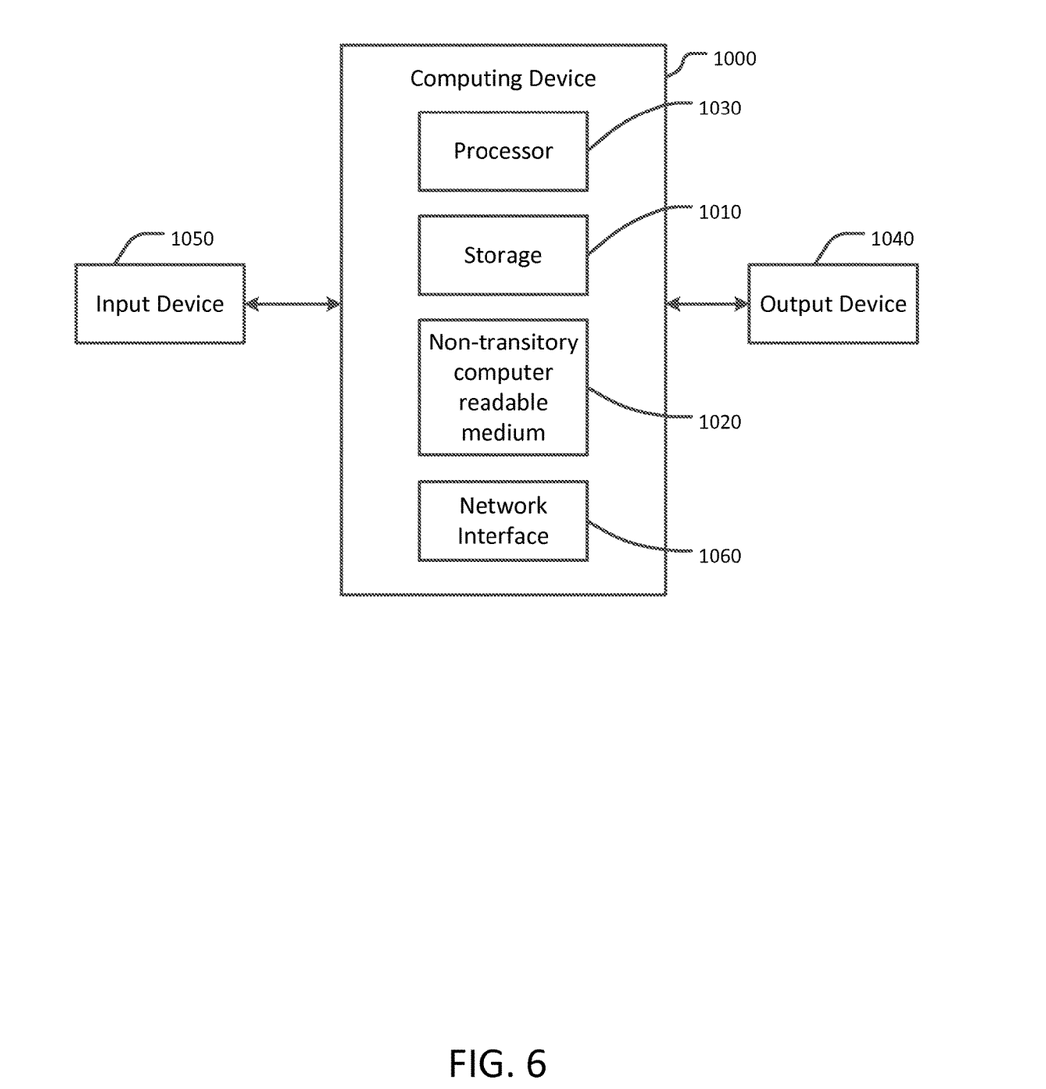
FIG. 6 is a block diagram representing an example computing system that may be used in accordance with an embodiment of the present invention.

FIG. 6 is a block diagram representing an example computing device 1000 that may be used to perform any of the techniques as variously described in this disclosure. For example, the input device 112, the processor 114, the display 116, the storage 130, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor (e.g., the display 116 of FIG. 1), which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a 3D printer. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the 3D model processing module 120, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 100, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving facet data representing a stereolithographic model, the facet data including a plurality of visible facets each representing a visible surface of the stereolithographic model; associating at least one of the visible facets with a component of the stereolithographic model; reordering a portion of the facet data such that each of the visible facets associated with the component is listed sequentially; assigning a unique identification value to the component; and delimiting the reordered portion of the facet data with at least one of a beginning facet and an ending facet containing the unique identification value, the beginning facet and the ending facet each representing an invisible surface of the stereolithographic model. In some cases, the process includes generating reference table data representing a mapping between the unique identification value and custom data associated with the component. In some cases, the process includes performing an operation on each of the visible facets associated with the component until a hidden triangle is reached, which marks the end of the component, and wherein the custom data represents the operation. In some cases, the process includes performing an operation on each of the visible facets associated with the component until a hidden triangle is reached, which marks the end of the component, according to a priority or weight associated with the component, and wherein the custom data represents the operation and the priority or weight. In some cases, the process includes performing at least one of a re-meshing operation, a search/extract/delete operation, and an unwrapping operation on each of the visible facets associated with the component until a hidden triangle is reached, which marks the end of the component. In some cases, the process includes appending the reordered portion of the facet data to the reference table data. In some cases, the process includes storing the reordered portion of the facet data in a Standard Tessellation Language (STL) file format. In some cases, the process includes viewing or printing the stereolithographic model using the reordered portion of the facet data. In some cases, each of the visible facets includes data representing a unit normal vector and three vertices in Cartesian space. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented data processing method comprising:
   receiving, by a processor, facet data representing a stereolithographic model, the facet data including a plurality of visible facets each representing a visible surface of the stereolithographic model;
   associating at least one of the visible facets with a component of the stereolithographic model;
   reordering, by the processor, a portion of the facet data each of the visible facets associated with the component is listed sequentially;
   assigning a unique identification value to the component;
   delimiting, by the processor, the reordered portion of the facet data with at least one of a beginning facet and an ending facet containing the unique identification value, the beginning facet and the ending facet each representing an invisible surface of the stereolithographic model, wherein the visible surface includes facets that are to be rendered or printed, and wherein the invisible surface excludes facets that are to be rendered or printed; and
   generating, by the processor, reference table data representing a mapping between the unique identification value and custom data associated with the component, wherein the custom data includes a method, operation or transformation that can be applied to a component of the stereolithographic model.

2. The method of claim 1, further comprising performing an operation on each of the visible facets associated with the component until a hidden triangle is reached, which marks the end of the component, wherein the custom data represents the operation.

3. The method of claim 1, further comprising performing an operation on each of the visible facets associated with the component until a hidden triangle is reached, which marks the end of the component, according to a priority or weight associated with the component, and wherein the custom data represents the operation and the priority or weight.

4. The method of claim 1, further comprising performing at least one of a re-meshing operation, a search/extract/delete operation, and an unwrapping operation on each of the visible facets associated with the component, until a hidden triangle is reached, which marks the end of the component.

5. The method of claim 1, further comprising appending the reordered portion of the facet data to the reference table data.

6. The method of claim 1, further comprising storing the reordered portion of the facet data in a Standard Tessellation Language (STL) file format.

7. The method of claim 1, further comprising viewing or printing the stereolithographic model using the reordered portion of the facet data.

8. The method of claim 1, wherein each of the visible facets includes data representing a unit normal vector and three vertices in Cartesian space.

9. A system comprising:
   a storage; and
   a processor operatively coupled to the storage, the processor execute instructions stored in the storage that when executed cause the processor to carry out a process comprising:
   receiving facet data representing a stereolithographic model, the facet data including a plurality of visible facets each representing a visible surface of the stereolithographic model;
   associating at least one of the visible facets with a component of the stereolithographic model;
   reordering a portion of the facet data each of the visible facets associated with the component is listed sequentially;
   assigning a unique identification value to the component;
   delimiting the reordered portion of the facet data with at least one of a beginning facet and an ending facet containing the unique identification value, the beginning facet and the ending facet each representing an invisible surface of the stereolithographic model, wherein the visible surface includes facets that are to be rendered or printed, and wherein the invisible surface excludes facets that are to be rendered or printed; and
   generating reference table data representing a mapping between the unique identification value and custom data associated with the component, wherein the custom data includes a method, operation or transformation that can be applied to a component of the stereolithographic model.

10. The system of claim 9, wherein the process includes performing an operation on each of the visible facets associated with the component until a hidden triangle is reached, which marks the end of the component, and wherein the custom data represents the operation.

11. The system of claim 9, wherein the process includes performing an operation on each of the visible facets associated with the component until a hidden triangle is reached, which marks the end of the component, according to a priority or weight associated with the component, and wherein the custom data represents the operation and the priority or weight.

12. The system of claim 9, wherein the process includes performing at least one of a re-meshing operation, a search/extract/delete operation, and an unwrapping operation on each of the visible facets associated with the component until a hidden triangle is reached, which marks the end of the component.

13. The system of claim 9, wherein the process includes appending the reordered portion of the facet data to the reference table data.

14. The system of claim 9, wherein the process includes storing the reordered portion of the facet data in a Standard Tessellation Language (STL) file format.

15. The system of claim 9, wherein the process includes viewing or printing the stereolithographic model using the reordered portion of the facet data.

16. The system of claim 9, wherein each of the visible facets includes data representing a unit normal vector and three vertices in Cartesian space.

17. A non-transient computer program product having instructions encoded thereon that when executed by one or more processors cause a process to be carried out, the process comprising:

receiving facet data representing a stereolithographic model, the facet data including a plurality of visible facets each representing a visible surface of the stereolithographic model;

associating at least one of the visible facets with a component of the stereolithographic model;

reordering a portion of the facet data such that each of the visible facets associated with the component is listed sequentially;

assigning a unique identification value to the component;

delimiting the reordered portion of the facet data with at least one of a beginning facet and an ending facet containing the unique identification value, the beginning facet and the ending facet each representing an invisible surface of the stereolithographic model, wherein the visible surface includes facets that are to be rendered or printed, and wherein the invisible surface excludes facets that are to be rendered or printed; and generating reference table data representing a mapping between the unique identification value and custom data associated with the component, wherein the custom data includes a method, operation or transformation that can be applied to a component of the stereolithographic model.

18. The non-transitory computer program product of claim 17, wherein the process includes performing an operation on each of the visible facets associated with the component until a hidden triangle is reached, which marks the end of the component.

19. The non-transitory computer program product of claim 17, wherein the process includes performing an operation on each of the visible facets associated with the component until a hidden triangle is reached, which marks the end of the component, according to a priority or weight associated with the component.

20. The non-transitory computer program product of claim 17, wherein the process includes appending the reordered portion of the facet data to the reference table data.

* * * * *